Inventor
Edgar W. Borrow

July 17, 1956  E. W. BORROW  2,754,750
TREATING GRASS AND OTHER CROPS
Filed March 13, 1953  3 Sheets-Sheet 3
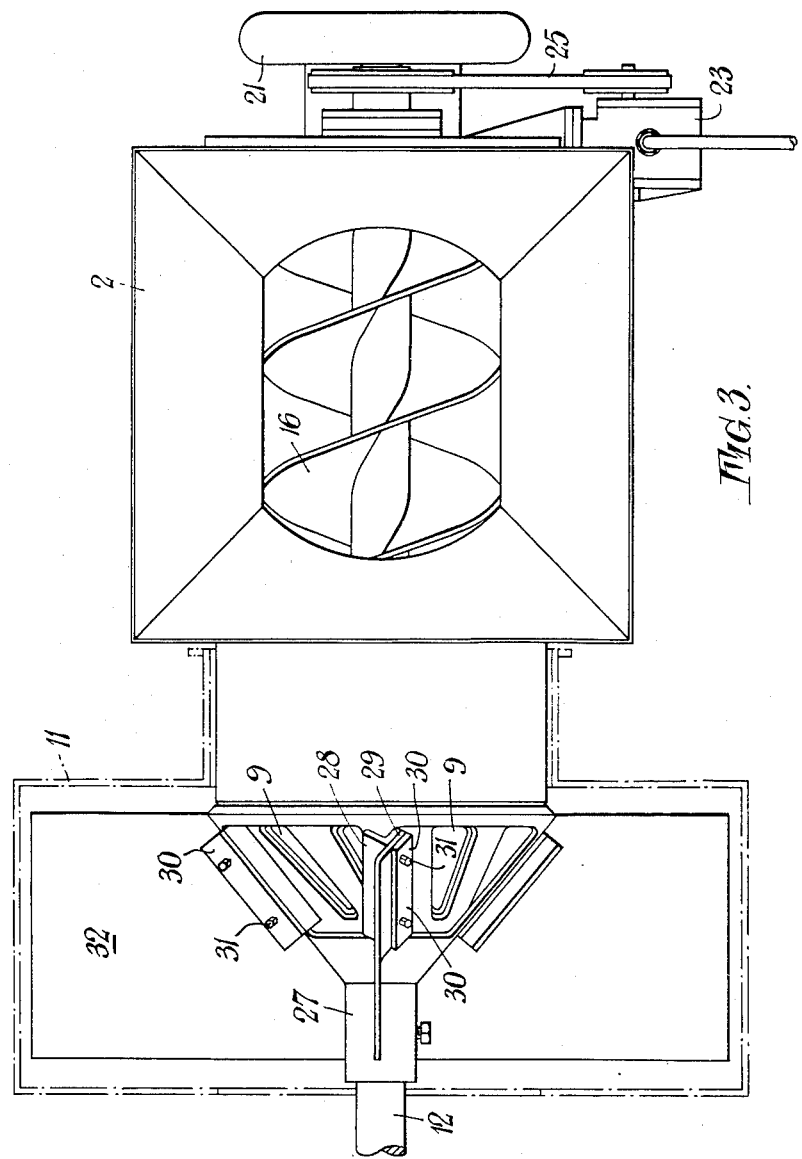

United States Patent Office 2,754,750
Patented July 17, 1956

2,754,750
TREATING GRASS AND OTHER CROPS

Edgar W. Borrow, Cowplain, Portsmouth, England

Application March 13, 1953, Serial No. 342,183

3 Claims. (Cl. 99—235)

This invention relates to a method of and machines for treating green grass or other agricultural crops and which may then be dried in a grass drier, used for conversion into silage or in some cases compressed into cakes or "cheeses." The intention is to conserve such crop for animal stuffs and the term "grass" (as used hereinafter) is intended to include other crops suitable for such conservation.

The invention is particularly applicable to two stage drum driers but may also be applied to other types of driers, or may be used separately from a grass drier, the product from the machine being collected and used or further treated as desired.

From one aspect, the invention provides a method of treatment of grass which comprises compressing the grass and expressing moisture from it by feeding it to a screw conveyor enclosed in a perforated casing and forcing the grass by the screw conveyor through apertures against knives by which it is chopped into suitable lengths.

From another aspect, apparatus for treating grass according to the invention comprises a screw conveyor enclosed in a stationary casing by which the grass is compressed and moisture expressed therefrom, the end of the casing being closed by a wall having apertures through which the grass is forced by the conveyor against knives rotated in contact with the wall of the casing about the axis of the screw conveyor whereby the grass is chopped into suitable lengths. The apparatus may be combined with a grass drier the chopped grass being fed into the drier by the conveyor.

From yet another aspect the invention provides a grass drier comprising a rotating drum through which hot gas is circulated by a fan, a hopper for fresh grass, a screw conveyor adapted to feed grass from the hopper to the gas-circulating system on the inlet side of the fan, a perforated casing surrounding the screw conveyor, a chamber at the discharge end of the conveyor having apertures in the wall thereof and a series of rotary knives in close contact with the apertured wall of the chamber, whereby the fresh grass is compressed in the perforated casing to express moisture therefrom, masticated by the rotary knives and fed into the drier, the worm when feeding grass sealing the gas circulating against inlet of air at the feeding point.

Preferably the arrangement is such that the hot gas by which the grass is dried is sucked by a fan through a drying stage and is blown by the fan through a pre-drying stage. The fan for circulating the hot gas through the drier and a blower for delivering a current of cold air to convey the dried material from the machine may be driven from a common power unit, preferably being mounted on a common shaft.

Other parts of the invention are embodied in the preferred form which will now be described in some detail by way of example, with reference to the accompanying drawings in which:

Fig. 3 is a plan.

Figure 1:
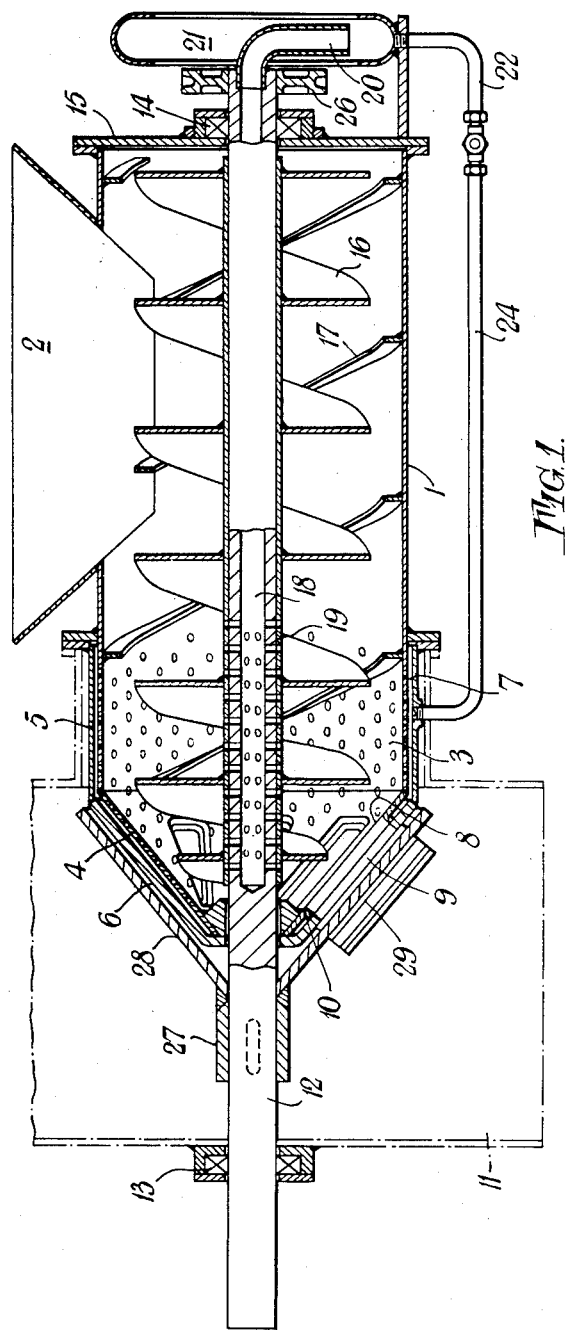
Fig. 1 is a longitudinal section of one form of the invention
Figure 2:
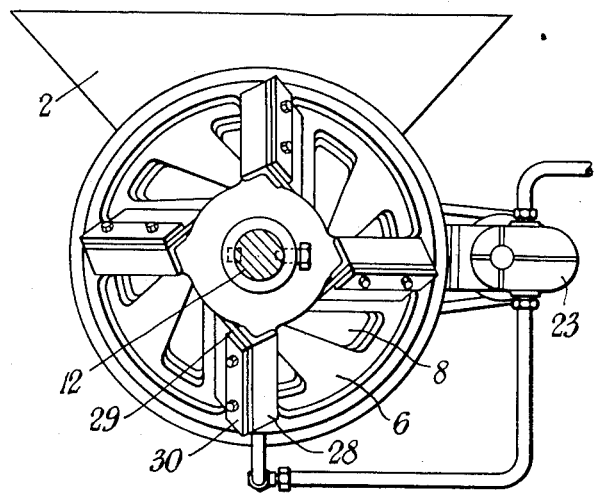
Fig. 2 is a sectional view on the line II—II of Fig. 1

Referring first to Figs. 1 to 3, the machine comprises a cylindrical casing 1 having a hopper 2 by which grass may be fed into the casing. The casing 1 is perforated with perforations 3 towards one end and at this end is closed by a conical wall 4, also perforated. Surrounding the perforated part of the casing is a cylindrical casing 5 having a conical end 6 which encloses the conical wall 4 and forms a fixed cutter head. Between the casings 1 and 5 there is an annular space 7. Apertures 8 are provided in the wall 4 in alignment with similar apertures 9 in the fixed cutter head 6, the apertures 8 being surrounded by a rim 10 which extends across the space 7.

The fixed cutter head 6 extends into a chamber 11 in which the cut grass may be collected.

A shaft 12 is mounted in a bearing 13 mounted on the wall of the chamber 11 and in a bearing 14 mounted on the end plate 15 of the casing 1. This shaft may be rotatably driven in any suitable way, for example by an electric motor, petrol engine or from the power take off shaft of a tractor or when the machine is used with a rotary drier from the driving means of the drier.

The shaft 12 is coaxial with the casing 1 and on it within the casing is mounted a worm or screw conveyor 16. Helical blades 17 are mounted on the inside of the casing 1 and co-operate with the helixes of the conveyor 16.

The shaft 12 within the casing is formed with an axial bore 18 and near the perforated end of the casing, radial holes 19 lead from this bore to the outside of the shaft. The bore 18 leads at the end of the shaft to a liquid delivery tube 20 which delivers into a collecting ring 21.

A pipe 22 leads from the ring 21 to the suction side of a pump 23 and a pipe 24 leads from the annular space 7 also to the suction side of the pump 23. This pump is driven by a belt 25 from a pulley 26 mounted on the shaft 12.

Keyed to the shaft 12 is a rotary cutter head 27 comprising a cylindrical portion and four arms 28 lying parallel to the fixed cutter head 6. These arms are of angle section and support knives 29 clamped between clamping plates 30 and one flange of the arms 28 by bolts 31. The knives 29 are in contact with the fixed cutter head 6 and are maintained in contact by the pressure of the grass fed along the worm which tends to move the shaft longitudinally. As a result the knives are self sharpening.

The operation of the machine should now be clear. Grass fed into the casing 1 through the hopper 2 is conveyed by the worm 16 towards the conical end wall 4. During this conveyance, the grass is compressed and liquid is expressed therefrom passing through the perforations into the annular space 7 and through the radial holes 19 into the bore 18 and thence into the collecting ring 21. This liquid is drained off by the pump 23 and delivered to a storage vessel (not shown).

The compressed grass is forced through the apertures 8 and 9 and is cut into short lengths by the rotating knives 29. The cut lengths of grass may be collected from the chamber 11. It may be blown by a fan into a hopper, for example, fan blades 32 may be mounted on the arms 28 as shown in Fig. 3 and enclosed in the casing 11 so as to throw the grass to a sufficient height to allow for the filling of a silo or a suitable storage receptacle from which it may be collected and ensilaged or compressed into cheeses or cakes for use as feeding stuffs for animals.

The liquid delivered from the pump 23 may be treated to extract the chlorophyll which it contains.

Figure 4:
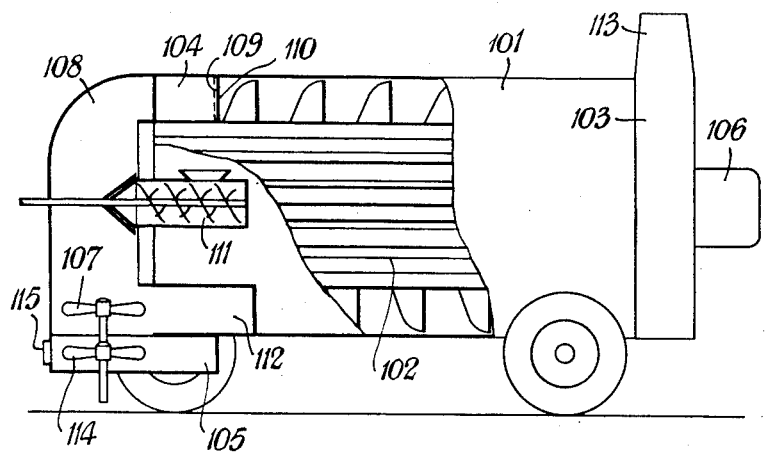
Fig. 4 is an elevation of a grass drier embodying a machine in accordance with the invention.

The cut grass may be delivered to a drier and advantageously the machine may be combined with a grass drier of the two stages type as shown in Fig. 4. In this drier a stationary external drum 101 is mounted on a wheeled chassis so that the apparatus is transportable. Within this external drum is mounted for rotation an inner drum 102 having internal baffle plates and external mounted helical vanes.

At each end of the rotating drum is a series of chambers or boxes arranged so as at one end 103 to transfer preheated material from the outside of the inner drum to the inside and at the other end 104 to deliver the dried material from the inside of the inner drum to a delivery duct 105.

At the same end of the drum as the transfer boxes 103 is mounted a combustion chamber 106 from which hot air (mixed with combustion products) is supplied to the interior of the inner drum.

At the other end of the drum is mounted a fan 107, preferably with its rotor rotating about a vertical axis. The suction side of this fan is connected by ducting 108 to that end of the drum at which the dried material is delivered. The ducting from the suction side of the fan opens into the top of the space 109 in which the delivery boxes rotate and is thus in communication with the interior of the inner drum which opens into the centre of this space. The fan thus draws hot air from the combustion chamber through the interior of the revolving drum. A sealing plate 110 is mounted on the exterior of the revolving drum behind the series of transfer chambers and extends close to the inner surface of the external drum to prevent the fan drawing air from the outside of the inner drum.

Apparatus 111 similar to that described with reference to Figs. 1 to 3 is mounted to deliver into the ducting 108 so that the chopped grass drops into the suction side of the fan 107 and is blown by the fan into ducting 112 leading to the outside of the inner drum. The fan blades may have plough ends to break up lumps of compressed grass.

The grass in the screw conveyor forms an effective seal against the inlet of air to the circulating system at the point where the grass to be dried is fed in.

The fan 107 blows the air with the grass to be dried along the outside of the inner drum to the end adjacent the furnace. The air passes thence into an exhaust 113 whilst the grass passes down the interior of the drum 102.

It will be seen that the hot air is sucked from the combustion chamber through the inside of the inner drum where it finishes drying the pre-dried material and is blown along the outside of the inner drum (where it pre-dries the fresh material) to the exhaust at the same end of the drum as is the furnace. The material to be dried enters the drier at the end remote from the furnace, passes along the outside of the drum in a pre-heating stage thence to the inside of the inner drum and back to the end of the machine near which it entered.

On the vertical shaft of the fan is mounted the rotor of a blower 114 which has an inlet 115 open to the atmosphere through which cold air is drawn. The dried material from the collecting chambers at this end falls into the outlet duct 105 from this blower and is cooled by the cold air current and conveyed thereby to the outside of the machine.

Petrol (or fuel oil) tanks may be arranged on the chassis in the space below and at each side of the external cylindrical casing.

It has been found that grass dried in the machine has a tendency to be moss-like and possesses certain "hold-together" qualities which make it very attractive for feeding to animals in that it does not blow away when the animals' nostrils come in contact with it nor does it need to be made into hard cubes or nuts.

It will be apparent that the invention is not restricted to the details of the preferred form which may be modified without departing from the broad ideas underlying them.

I claim:

1. An apparatus for treating grass comprising a cylindrical casing having an inlet for grass and a conical wall at one end thereof, said conical end wall being provided with a plurality of large apertures, a rotary shaft supported axially in said casing and extending through the apertured conical wall, a screw conveyor mounted on said shaft for conveying grass from said inlet to the conical wall and for compressing the grass and expressing moisture therefrom during the conveying movement and forcing the grass through the apertured conical end wall, a plurality of knives mounted on said shaft outside said casing and bearing against the apertured end wall to effect a cutting action on the grass as the grass is forced through the apertured end wall, said shaft being axially movable in relation to the casing to draw the knives against the outside of the apertured end wall, the wall of the casing near the conical end wall being perforated to pass moisture expressed from the grass, an imperforate cylindrical wall surrounding said perforated portion of the casing wall to provide a space into which moisture expressed from the grass within the casing is received, and an outlet for said moisture from said space.

2. An apparatus as set forth in claim 1, wherein said shaft being hollow and the wall thereof being perforated, and an outlet from the interior of said shaft for moisture expressed from the grass within the casing.

3. An apparatus as set forth in claim 1, wherein said knives are mounted on arms parallel to the generatrix of the conical end wall, each arm being of angle section with the knife being clamped between a flange of the angle side and a clamping plate.

References Cited in the file of this patent

UNITED STATES PATENTS

| | | |
|---|---|---|
| 754,249 | Snow et al. | Mar. 8, 1904 |
| 1,394,162 | Gebhardt | Oct. 18, 1921 |
| 2,017,580 | Bayley | Oct. 15, 1935 |
| 2,144,055 | Hall | Jan. 17, 1939 |
| 2,397,363 | McLeod | Mar. 26, 1946 |
| 2,488,653 | Andree et al. | Nov. 22, 1949 |
| 2,597,442 | Borrow | May 20, 1952 |
| 2,605,800 | Mateu | Aug. 5, 1952 |